(12) United States Patent
Worster

(10) Patent No.: US 6,307,834 B1
(45) Date of Patent: Oct. 23, 2001

(54) REDUNDANT TRANSMISSION SYSTEM WITH DISCONNECTION OF A TRANSMISSION PATH EXHIBITING FAULTY TRANSMISSION BEHAVIOR

(75) Inventor: Thomas Worster, Boston, MA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/049,678

(22) Filed: Mar. 27, 1998

(30) Foreign Application Priority Data

Mar. 27, 1997 (DE) .............................. 197 13 065

(51) Int. Cl.[7] .................................................. G01R 31/08
(52) U.S. Cl. .................... 370/218; 370/228; 370/395; 370/248; 370/418; 714/43; 340/825.01
(58) Field of Search .................... 370/218, 219, 370/228, 248, 394, 395, 412, 413, 419, 417, 418, 244, 250; 714/43, 2, 47; 709/239; 840/825.01

(56) References Cited

U.S. PATENT DOCUMENTS

| 5,151,899 | * | 9/1992 | Thomas et al. | 370/394 |
| 5,200,950 | | 4/1993 | Foglar et al. | 370/219 |
| 5,222,063 | | 6/1993 | Foglar et al. | 370/220 |
| 5,278,849 | * | 1/1994 | Hall | 714/811 |
| 5,325,358 | | 6/1994 | Goeldner | 370/219 |
| 5,559,959 | * | 9/1996 | Foglar | 370/395 |
| 5,590,122 | * | 12/1996 | Sandorfi et al. | 370/394 |
| 5,671,215 | * | 9/1997 | Foglar | 370/227 |
| 5,953,337 | * | 9/1999 | Almay | 370/394 |

* cited by examiner

Primary Examiner—Seema S. Rao
(74) Attorney, Agent, or Firm—Schiff Hardin & Waite

(57) ABSTRACT

In a transmission system in which redundant message cells are forwarded via redundant transmission paths according to the Asynchronous Transfer Mode, a transmission path is blocked after the occurrence of a small number of errors in the sequence of the transmitted message cells, while for an admission of a transmission path a large number of successive message cells without error in the sequence is required.

6 Claims, 2 Drawing Sheets

REDUNDANT TRANSMISSION SYSTEM WITH DISCONNECTION OF A TRANSMISSION PATH EXHIBITING FAULTY TRANSMISSION BEHAVIOR

BACKGROUND OF THE INVENTION

1. Field of the Invention

The present invention is directed to a method for disconnecting or activating a transmission path exhibiting a faulty transmission behavior in a transmission system of the type wherein redundant message cells are respectively transmitted via redundant transmission paths.

2. Description of the Prior Art

Methods of the above type are known from European Application 0 384 936, European Application 0 453 606 (corresponding to U.S. Pat. No. 5,222,063) and European Application 0 453 607 (corresponding to U.S. Pat. No. 5,200,950), which operate as follows.

In ATM (Asynchronous Transfer Mode) transmission, the sequence of message cells that belong to a virtual connection is to be maintained. For the designation of the sequence, the message cells have a sequence number assigned in cyclically progressing fashion in a field for the sequence number. In order to maintain a predetermined loss probability, a parallel forwarding or routing, with through-connections via redundant transmission paths can be required. At the reception location of the redundantly transmitted message cells only a message cell expected as the next one in the sequence is selected. From, the aforementioned European Applications 0 384 936, 0 453 606 and 0 453 607, algorithms are known in which each message cell that is the next message cell following the message cell currently accepted as the last message cell for further processing, which arrives on the same transmission path (active transmission path) as the message cell currently accepted as the last message cell for further processing, is accepted for further processing.

SUMMARY OF THE INVENTION

An object of the present invention is to provide a method that achieves a rapid disconnection of a transmission path operating in a faulty manner, but having a tolerance for losses of message cells that occur sporadically on the transmission path.

The above object is achieved in a method of the type initially described, wherein, for each transmission path, the sequence number of the last-transmitted message cell is stored, the sequence number of a currently-incoming message cell is compared with the sequence number stored for the relevant transmission path, as a result of the comparison it is determined whether the currently-incoming message cell is accepted for further processing. A counter state (count) is maintained for each transmission path and when a currently-incoming message cell is accepted for further processing, the counter state for the relevant transmission path is increased by a first value. In the event of an incorrect sequence number for the currently-incoming message cell, the counter state of the relevant transmission path is decreased by a second value. A transmission path having a counter state which reaches a lower threshold value is excluded from accepting subsequent message cells for further processing.

In the inventive method, the monitoring for a transmission path that is tolerant in relation to normal losses of individual message cells, but results in a disconnection of the transmission path when there is an increase in the error rate that is characteristic of substantial errors. After a disconnection of the transmission path, a multiplicity of message cells received as error-free is required for re-admission (re-activation) of the disconnected path, which ensures that only a transmission path exhibiting an elevated degree of freedom from error is activated.

In an embodiment of the invention the first value is smaller than the second value. In addition to a tolerance in relation to normal losses of individual message cells, this measure leads to an accelerated disconnection of the transmission path in the event of substantial errors. In relation to the small number of errors required for disconnection, for an admission of the transmission path a large number of message cells received without errors is required, which ensures that only a transmission path with a high degree of freedom from error is activated.

In another embodiment of the invention an admission of a transmission path for the acceptance of message cells ensues only after an upper threshold has been exceeded. This measure results in hysteresis between activation and disconnection, Which prevents overly frequent activation and disconnection, but ensures that the transmission path is activated only when a high degree of freedom from error has been achieved.

In a further embodiment a state character (Q) is allocated to a transmission path, the state character being reset when the lower threshold value is reached, and reset when the upper threshold is exceeded. The exclusion or the admission of the associated transmission path is defined, respectively in accordance with the state character. This measure results in a simple interface to the selection algorithm.

The state character Q can be reset for all transmission paths except one, independent of the associated counter states. This measure results in an operation effected manually by an operator, with only one transmission path.

DESCRIPTION OF THE PREFERRED EMBODIMENTS

Figure 1:
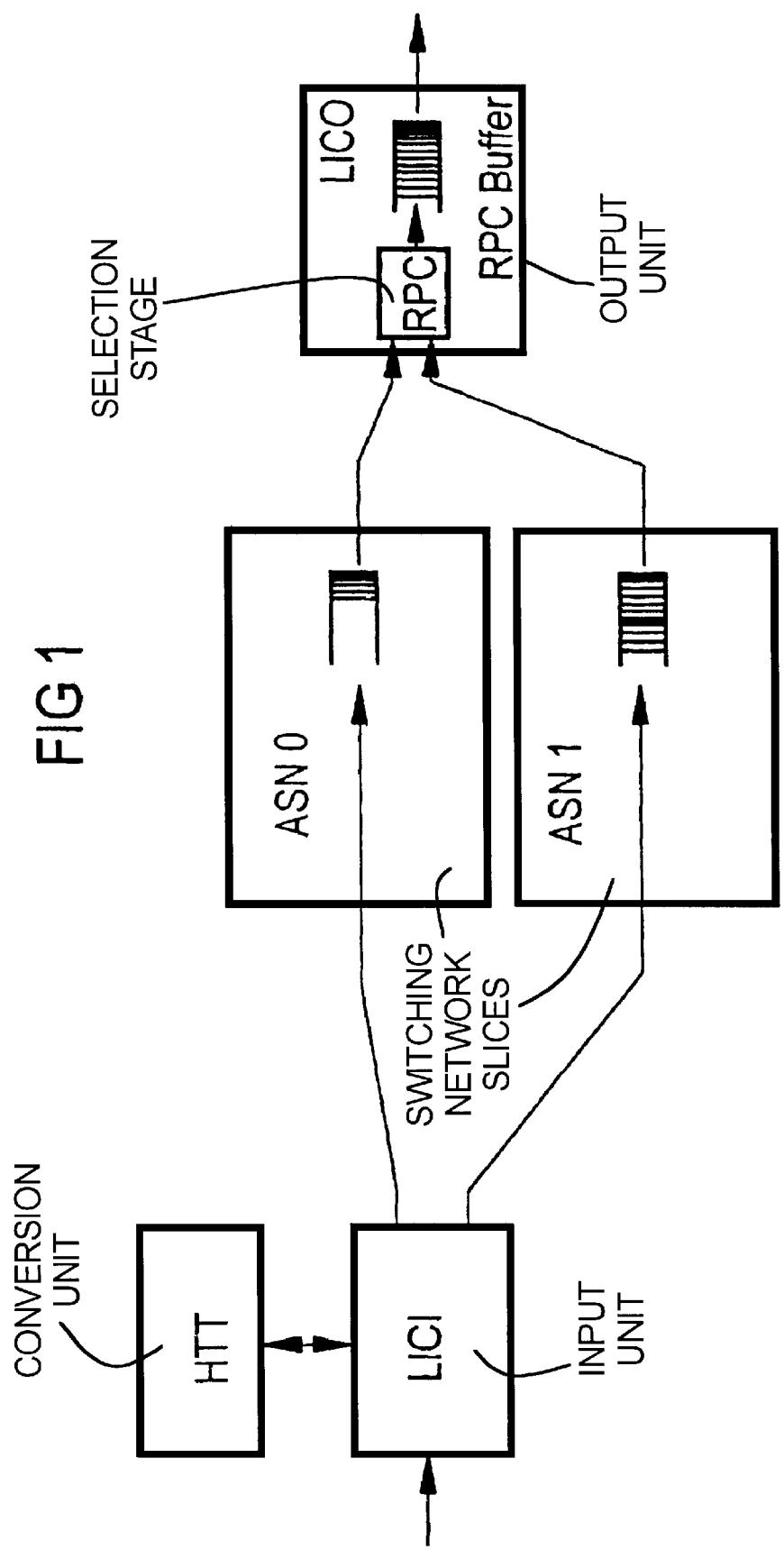
FIG. 1 is a schematic representation of a switching apparatus that switches through forwarded message cells via redundant transmission paths according to an asynchronous transmission method operable in accordance with the inventive method.

The switching arrangement shown in FIG. 1 has at the input side an input unit LICI (Line Interface Circuit Input), to which are supplied message cells transmitted according to an asynchronous transmission method, in particular ATM (Asynchronous Transfer Mode) in the course of virtual connections. For example, 8192 virtual connections can be given.

Figures 2, 3:
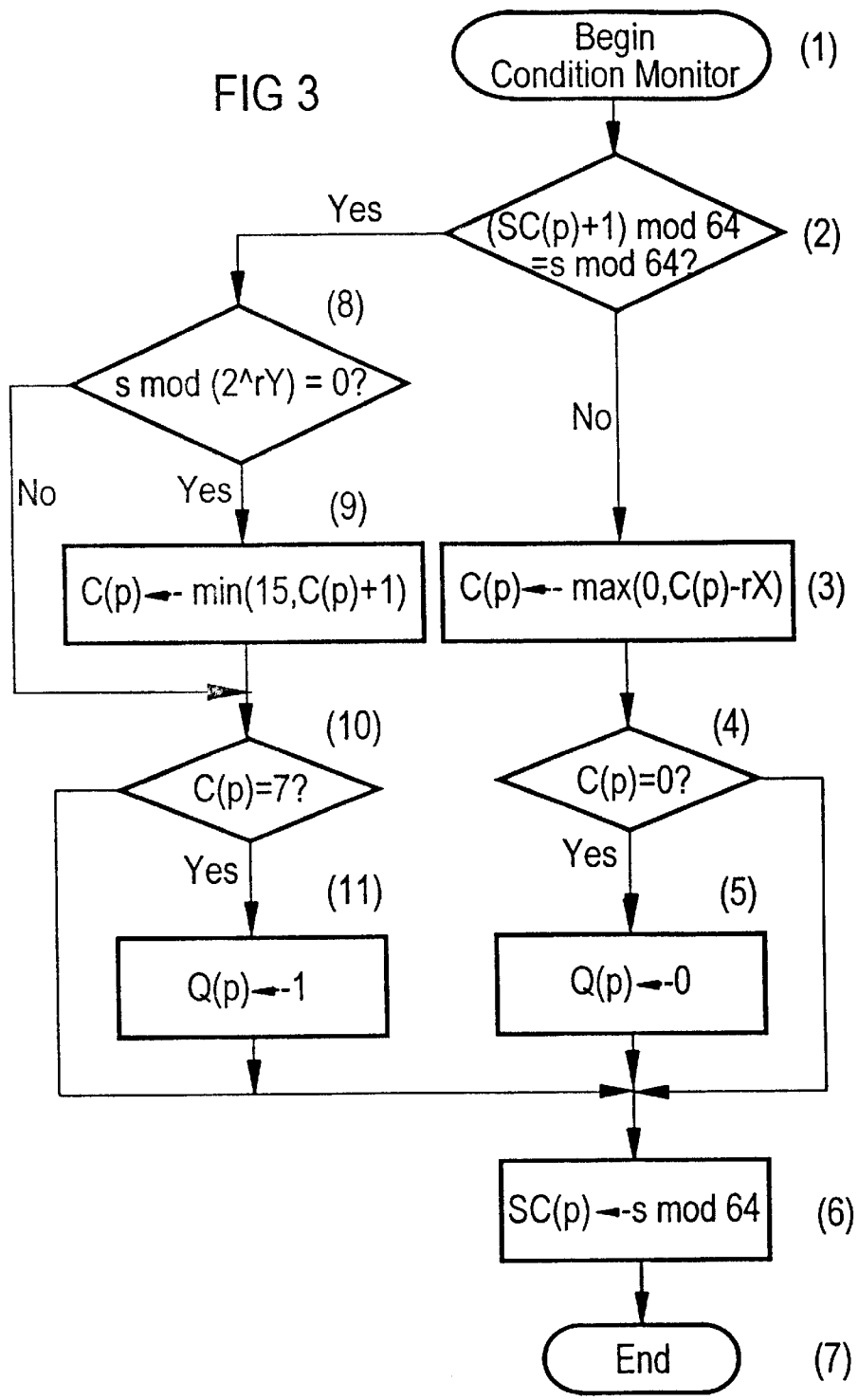
FIG. 2 is a schematic illustration of a message cell employed in the inventive method.
FIG. 3 is a flowchart of the inventive method.

A message cell shown in FIG. 2 has a fixed length, and is fashioned with a useful data part DATA and a message cell header HEAD prefixed to this part. The useful data part may comprise 48 bytes and the message cell head may comprise 5 bytes in length. The message cell header HEAD contains destination information VPI (Virtual Path Identifier)/VCI (Virtual Channel Identifier) that indicates the message cell as belonging to a virtual connection and that indicates the receiver. When a message cell arrives in the input unit LICI, the destination information of the message cell is supplied to a conversion unit HTT (Header Translation Table) that adds an item of through-connection information ROUT (stands for ROUTing) to the message cell in accordance with the destination information. The through-connection information indicates the output of the switching arrangement, to which the message cell is to be through-connected via a switching network slice ASN (Asynchronous Switching Network). In order to maintain a predetermined loss probability of e.g. $10^{-9}$, a parallel through-connection can be required via redundant switching network slices. The switching arrangement has two redundant switching network slices ASN0, ASN1, which form redundant transmission paths. In the input unit LICI, a multiplication of the message cells takes place, corresponding to the number of switching network slices (in the exemplary embodiment this is a doubling), to form a group of message cells having identical content. A message cell has a sequence number that is cyclically progressively assigned for successive message cells belonging to a virtual connection. The sequence numbers may be allocated to the message cells in increasing numerical order. The sequence numbers SNmax (Sequence Number Maximum) of a virtual connection, which can be distinguished from one another, define a message cell sequence cycle NZZ. The message cells of a group have the same sequence number. Via the redundant switching network slices, a message cell from a group of message cells is connected through to the relevant output.

The redundant switching network slices ASN0, ASN1 have at their outputs large memories for buffering message cells. Between redundant message cells that are supplied to the selection stage RPC of the switching network slices ASN0, ASN1, a phase displacement can occur. In order to avoid sequence errors between message cells belonging to the same virtual connection, the duration of a message cell sequence cycle is larger than the maximum transit time difference to be expected between the transmission paths.

The message cells emitted by the redundant switching network slices are received by an output unit LICO (Line Interface Circuit Output). In the output unit LICO, the received message cells are checked for errors. This can take place by checking parity bits. Message cells determined to be faulty are rejected. The output unit LICO has a selection stage RPC (Redundant Path Combination) that selects and further processes only one message cell from a group of message cells received as error-free. The further processing may take place by means of a forwarding via an RPC buffer and a line to a remotely disposed means.

In the forwarding of message cells according to the ATM transmission method, for a virtual connection the sequence of the message cells is to be maintained.

The selection stage RPC has a memory such as a random access memory RAM that contains a memory line for each virtual connection VC1, VC2, . . . , VCn. In the memory line, a location SC is reserved for storing the sequence number SL of the last-forwarded message cell for the relevant virtual connection. In addition, in the memory line a memory location a is reserved for each connection. The location a designates the transmission path via which the message cell selected at the moment as the last to be forwarded was transmitted to the relevant connection. The content of the memory location thus indicates the currently active transmission path. In addition, per transmission path p the lower-valued part of the sequence number s is stored in the location SC(p) per connection.

In the selection stage RPC, it is checked whether an incoming message cell, based on its sequence number, is the one that, for the relevant virtual connection, is the next one to be forwarded following the last-forwarded message cell based on its sequence number. For this purpose, a recombination algorithm evaluates the sequence number stored in the memory line for the relevant virtual connection, and evaluates the content of the memory location. The determination of the next-following message cell can take place by incrementing the stored sequence number of the lastforwarded message cell, and the sequence number of a message cell just being connected through is compared with the incremented stored sequence number. The determination of the next-following message cell is thereby accomplished by an easily executed comparison of the sequence numbers.

In general, the message cell arriving as the first in the output direction is forwarded to a group of message cells. A message cell that arrives later in the direction of selection than a message cell that belongs to the same group and was previously selected for forwarding is rejected. Particular recombination algorithms for determining the message cell that is the next to be forwarded for a virtual connection are known, for example, from European Applications 0 384 936, 0 453 606 and 0 453 607.

The direction of selection is undertaken using a counter C (Condition Monitor Counter) for each transmission path. The counter state of the counter C is raised by a first value for a message cell that is received as error-free and with the expected sequence number and is determined for further processing—if the message cell arrives via the transmission path belonging to the counter C—and is lowered by a second value if the message cell is received with errors or is not received with the expected sequence number. The selection of the sizes of the first and second quantities is made as follows, taking into account the portion of the overall number of transmission paths occupied by one transmission path. In order to increase the counter state of the associated counter C by a predetermined amount, number of message cells that are transmitted via a transmission path under consideration, and that are determined for further processing, is required that is larger than the number of message cells transmitted over a path other than the transmission path under consideration and determined for further processing in order to lower the counter state of the counter belonging to the transmission path under consideration by the predetermined amount. In a transmission system with only two transmission paths, for each transmission path the counter state of the associated counter C may be lowered by the value 2 for each message cell that is not the one with the expected sequence number, and may be increased by the value 1 for each message cell whose sequence number at the bit at the $4^{th}$ location has a change from the high state (high) to the low state (low). If the counter state reaches a predetermined lower threshold value US, a state character Q (Quality) is reset for the associated transmission path. The lower threshold US may be given by the output state of the counter C, in which the counter state has the value zero. A reset state character Q indicates that the associated transmission path is ruled out for the selection for the acceptance of message cells to be further processed.

The sustained rate of tolerated errors in the sequence amounts to one error in the sequence of $X*2^Y$ message cells in succession, whereby X stands for the smaller value and Y stands for the location of the bit of the sequence number of a message cell upon whose change from the high state (high) to the low state (low) a counter is incremented. If X=2 and Y=4 are selected, a rate of errors in the sequence greater than approximately 3.2% is recognized as failure of the relevant transmission path.

A number of errors must occur in the sequence before a failure of a transmission path is confirmed. The actual number depends on the small value X and the error rate. If each incoming message cell has an incorrect sequence number, then OS/X message cells must arrive before a failure of the relevant transmission path is confirmed. Given selection of the value 2 for the smaller value X, it is highly improbable that a transmission path will be ruled out for the selection of the acceptance of message cells to be further processed only because of an apparent loss of message cells due to an overflow of a buffer occurring with a probability of $10^{-5}$.

In order to set a state character Q, the associated counter state must reach an upper threshold value OS, which may be given by the highest representable value of the counter. This means that the associated transmission path must first have transmitted message cells without error for a longer time period at a high percentage rate, before it is admitted (qualified) as being available for the acceptance of message cells therefrom to be further processed. The state character Q can be set by means of a sequence of message cells that is in the overall sequence without any errors and that has a length of $OS*2^Y$ message cells. In the example with OS=7 and Y=4, this is 112 message cells.

In the inventive method, for the admission or exclusion of a transmission path for the selection for the acceptance of message cells to be further processed, a hysteresis, and thereby a Schmitt trigger function, is given by the various threshold values. In running through the counter states in the direction for the exclusion of a transmission path, a number of message cells arriving in a faulty sequence is required that is smaller in relation to the larger number of message cells arriving in the correct sequence, which lead to the running through of the counter states in the direction for the admission of a transmission path. Message cells arriving in a faulty sequence thus lead more rapidly to a blocking of a transmission path, in relation to message cells coming in in the correct sequence, which lead more slowly to an admission of a transmission path.

If a currently excluded transmission path is the one that transmitted the message cell that is currently accepted as the last one for further processing (active transmission path), a changeover takes place to a remaining transmission path for which a state character Q is not reset. The changeover may take place on the transmission path following next cyclically after the designation. After the changeover, the first message cell received as error-free is further processed. As the next message cell, that message cell is then determined that has the sequence number that follows next after this first message cell.

The changeover can take place by means of a board controller allocated to the output unit LICO.

The resetting of the state character Q can be effected manually by an operator in one embodiment.

If only one admitted transmission path remains, each message cell received error-free by this transmission path is selected for further processing.

If all the transmission paths have been ruled out for the selection for accepting message cells to be processed further, each message cell received as error-free is selected for further processing.

FIG. 3 shows a flowchart for the inventive method, for a transmission path designated p. At point (1), the procedure is started, with the arrival of a message cell. At point (2), it is checked whether, based on its sequence number, the currentlyincoming message cell is the message cell following next after the message cell arrived as the last one, based on its sequence number. If the result of the query is negative (No), the procedure continues with point (3), in which the counter state C of the associated transmission path p is reduced by the value X. After point (3), the procedure continues with point (4), in which it is checked whether the counter state C of the associated transmission path p has reached the lower threshold value 0 (zero). If the result of the query is positive (Yes), the procedure continues with point (5), in which the state character Q of the associated transmission path p is reset to the value 0 (zero). The state character with the value zero designates a faulty transmission path, and, for the case in which the selection means has currently locked onto this transmission path as the active transmission path, effects a changeover to another transmission path. After point (5), the procedure continues with point (6), in which, for the transmission path p under consideration, the lower-valued 6 bits of the sequence number s of the currently arrived message cell are stored in the location SC(p). If the query result in point (4) is not positive, the procedure continues with point (6). If the query result in point (2) is positive (Yes), the procedure continues with point (8), in which it is queried whether the sequence number s of the currently arrived message cell has a change from the high state (high) to the low state (0, low) at the bit at the Yth location. The query at point (8) thus has the function of a divider for the sequence numbers of the incoming message cells. If the result of the query is positive (Yes), the procedure continues with point (9), in which the counter state C of the associated transmission path p is incremented by the value 1. After point (9), the procedure continues with point (10), in which it is checked whether the counter state C(p) of the associated transmission path p has reached the upper threshold value 7. If the result of the query at point (10) is positive (Yes), the procedure continues with point (11), in which the state character Q of the associated transmission path p is set to the value 1. After point (11), the procedure continues with point (6). Given a negative query result (No) at point (8), the procedure continues immediately with point (10). If the query result at point (10) is not positive, the procedure continues with point (6). After point (6), the procedure continues with point (7), in which the current execution of the procedure is terminated.

For simpler and clearer representation, the subject matter of the invention has been described above for only two transmission paths; however, the inventive method can be employed for transmission systems having a large number of transmission paths.

The principle according to which a single transmission path is blocked after the occurrence of a small number of errors in the sequence of the transmitted message cells, while in contrast a large number of successive message cells without errors in the sequence is required for an admission of the transmission path, is of independent significance.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for disconnecting and activating a transmission path having a faulty transmission behavior in a transmission system, comprising the steps of:

respectively allocating cyclically progressing sequence numbers to message cells in a plurality of message cells for a virtual connection;

duplicating at least one of said message cells multiple times to form a group of redundant message cells equal in number to a plurality of redundant transmission paths;

respectively transmitting said redundant message cells via said redundant transmission paths;

at a reception location, storing the sequence number for each transmission path of a last-transmitted message cell;

for each transmission path, comparing the sequence number of a currently incoming message cell with the sequence number stored for the transmission path;

dependent on said comparison, determining whether said currently-incoming message cell is accepted for further processing;

maintaining a counter state for each transmission path;

when a currently-incoming message cell is accepted for further processing, incrementing said counter state for the transmission path, from which the currently incoming message cell arrived, by a first value;

if said currently-incoming message cell has a faulty sequence number, decrementing the counter state of the transmission path, from which said currently-incoming message cell arrived, by a second value which is larger than said first value; and excluding any transmission path having a counter state which reaches a lower threshold value from subsequently accepting message cells for further processing.

2. A method as claimed in claim 1 comprising the additional step of:

before comparing the sequence number of the currently-incoming message cell to the stored sequence number, testing the sequence number of said currently-incoming message cell for faultiness.

3. A method as claimed in claim 1 comprising the additional step of:

qualifying a transmission path for accepting message cells only if the counter state for the transmission path has achieved an upper threshold.

4. A method as claimed in claim 3 comprising the additional steps of:

allocating a state character respectively to each transmission path;

resetting said state character if said lower threshold value is reached by the counter state allocated to a transmission path and setting said state character if said upper threshold is achieved; and excluding or qualifying each transmission path dependent on the state of said state character.

5. A method as claimed in claim 4 comprising the additional step of:

resetting said state character for all but one of said transmission paths, independent of the respective counter states of said transmission paths.

6. A method as claimed in claim 1 comprising the additional step of:

setting the counter state for each of said transmission paths to a predetermined value upon commissioning of the system.

* * * * *